United States Patent [19]
Akkapeddi et al.

[11] Patent Number: 5,285,511
[45] Date of Patent: Feb. 8, 1994

[54] OPTOELECTRONIC CABLE CONNECTOR

[75] Inventors: Kaushik S. Akkapeddi, Hanover Township, Morris County; Michael G. German, Secaucus; Constance R. Pallas, Parsippany Township, Morris County; William J. Parzygnat, Morris Township, Morris County, all of N.J.; David A. Snyder, Sprinfield, Pa.

[73] Assignee: AT&T Laboratories, Murray Hill, N.J.

[21] Appl. No.: 44

[22] Filed: Jan. 4, 1993

[51] Int. Cl.$^5$ ............................................. G02B 6/36
[52] U.S. Cl. ..................................... 385/89; 385/88; 385/59; 385/71; 439/582
[58] Field of Search .................. 385/88, 89, 90, 91, 385/92, 93, 94, 59, 71; 439/214, 216, 210, 211, 676, 581, 582

[56] References Cited

U.S. PATENT DOCUMENTS

| | | | |
|---|---|---|---|
| 4,586,763 | 5/1986 | Paulsen et al. | 339/6 |
| 4,680,674 | 7/1987 | Moore | 361/395 |
| 4,802,178 | 1/1989 | Ury | 372/36 |
| 5,155,785 | 10/1992 | Holland et al. | 385/89 |

Primary Examiner—John D. Lee
Assistant Examiner—Phan Thi Heartney
Attorney, Agent, or Firm—Roderick B. Anderson

[57] ABSTRACT

A plurality of optical fibers (14–14E) are interconnected by using connectors each comprising an optoelectronic device (13–13E) adapted to be connected to an end of each optical fiber for converting optical signals to electrical signals and for converting electrical signals to optical signals. Each connector has a first contact (12–12E) having a cylindrical plug end and a cylindrical socket end located on a common axis and a transverse conductor (21) extending transversely to the axis (20) from the first contact and connected to the optoelectronic device of the connector. The plug end of each contact is adapted to fit snugly within the socket end of another first contact, whereby all of the contacts may be connected and arranged along the common axis. Each of the contacts is free to rotate with respect to other contacts to which it is connected; this permits the various optical fibers to extend in different radial directions from the axis. In a preferred embodiment, each connector further comprises second (23) and third (24) hollow cylindrical contacts surrounding the first contact (22). Hollow cylindrical insulators (26, 27) separate and insulate the first, second and third contacts, and appropriate slots permit transverse conductors (29, 31, 32) of the contacts to be connected to the optoelectronic devices (41). In this manner, each connector interconnects electrical ground and power lines, as well as the optical signal lines of the various optical fiber cables (40).

19 Claims, 7 Drawing Sheets

FIG. 7

OPTOELECTRONIC CABLE CONNECTOR

TECHNICAL FIELD

This invention relates to connectors and, more particularly, to apparatus for connecting optical fiber cables.

BACKGROUND OF THE INVENTION

Optical fiber cables are becoming increasingly popular for use in complex electronic data and communication networks because of their high transmission capacity. Such networks may, for example, comprise interconnected computers, peripheral devices, multimedia devices, displays, voice synthesizers and the like. The transmission requirements required for such networks can be met by optical fiber cables, and the flexibility of use of such networks requires that component devices be conveniently interconnected and disconnected.

Flexibility can be built into a connector for optical fiber cables by using in each connector an optoelectronic device for converting optical signals to electrical signals and converting electrical signals back to optical signals; then the connector mechanisms can be entirely electrical. Conventional electrical connectors, however, have been found to be disadvantageous because they are somewhat cumbersome and they sometimes produce harmful stresses on optical fiber cables. Unlike electrical cables, optical fiber cables cannot be bent at sharp angles and, for this reason, it would be desirable to have a connector which can accommodate optical fibers that branch off in various directions without requiring sharp bends in the cables. Optical fiber cables typically also comprise an electrical power conductor and an electrical ground conductor. It would be desirable to interconnect these electrical conductors along with the optical fibers of the different cables. It would also be desirable to have a connector which is easily manufactured and which is easy to connect and disconnect during use. For the foregoing reasons, there has developed a long-felt need for optical fiber cable connectors that are reasonably easy and convenient to assemble, are easy to use, can interconnect electrical lines as well as optical fibers, and which can accommodate optical fiber cables extending in any of various directions.

SUMMARY OF THE INVENTION

According to one embodiment of the invention, a plurality of optical fibers are interconnected by using connectors each comprising an optoelectronic device adapted to be connected to an end of each optical fiber for converting optical signals to electrical signals and for converting electrical signals to optical signals. Each connector has a first contact having a cylindrical plug end and a cylindrical socket end located on a common axis and a transverse conductor extending transversely to the axis from the first contact and connected to the optoelectronic device of the connector. The plug end of each contact is adapted to fit snugly within the socket end of another contact, whereby all of the contacts may be connected and arranged along the common axis. Each of the contacts is free to rotate with respect to other contacts to which it is connected; this permits the various optical fibers to extend in different radial directions from the axis.

In a preferred embodiment, each connector further comprises second and third hollow cylindrical contacts surrounding the first contact. Hollow cylindrical insulators separate and insulate the first, second and third contacts, and appropriate slots permit transverse connectors to be connected to the optoelectronic devices. In this manner, each connector interconnects electrical ground and power lines, as well as the optical signal lines of the various optical fiber cables.

As will be seen from the discussion below, the connector is of simple construction, is easy to assemble, is easy to use and does not produce any significant mechanical stresses on the optical fiber cables. These and other objects, features and benefits of the invention will be better understood from a consideration of the following detailed description taken in conjunction with the accompanying drawing.

DETAILED DESCRIPTION

Figure 1:
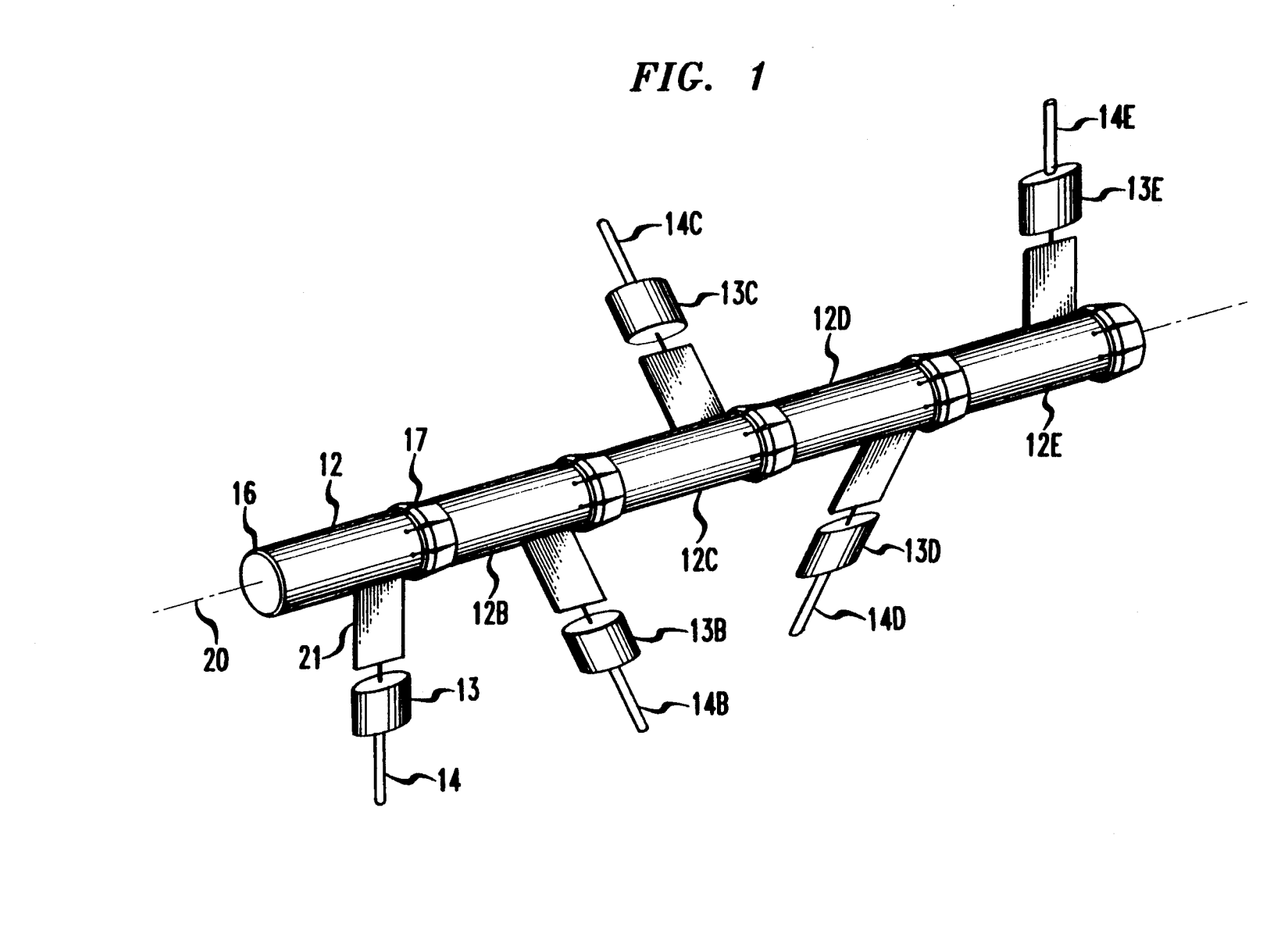
FIG. 1 is a schematic view showing how signal contacts, in accordance with the invention, can interconnect optical fibers extending in different radial directions.

Referring now to FIG. 1, in accordance with one aspect of the invention, each connector comprises a hollow cylindrical conductive signal contact 12 and an optoelectronic device 13. Other contacts 12B-12E and optoelectronic devices 13B-13E of other connectors are shown to illustrate how the connectors cooperate to interconnect components of a network. Each of the optoelectronic devices 13 is adapted to be connected to an optical fiber 14 of an optical fiber cable. The optoelectronic device converts optical signals to electrical signals and it converts electrical signals back to optical signals. Thus, for example, an optical signal on optical fiber 14 is converted to an electrical signal so that it can be transmitted by a signal contact 12 to a signal contact 12B, thence to optoelectronic device 13B, where it is converted back to an optical signal for transmission on optical fiber 14B. Optoelectronic devices are described in more detail, for example, in the U.S. patent of Holland et al., U.S. Pat. No. 5,155,785, granted Oct. 13, 1992.

All of the contacts 12-12E are identical and all have a beveled plug end 16 and a beveled socket end 17. The plug end 16 of the contact 12 constitutes a conductive annulus adapted to fit snugly within a conductive annular detent of a socket end 17 of another contact. Each of the conductive annular detents of each socket end 17 is defined by a circular array of cantilevered detent portions, each adapted to be deflected away from the axis to receive a plug end. Notwithstanding the segmentation of the socket end, the plug end and a socket end of connected contacts make continuous conductive contact, regardless of relative angles of rotation. As a consequence, the different optical fibers 14-14E can extend in arbitrary radial directions with respect to a common central axis 20.

A transverse conductor 21 transmits current between the cylindrical portion of each contact and the corresponding optoelectronic device 13. Each of the different optical fibers are of course preferably part of an optical fiber cable and are connected to a component of a network such as a computer. Thus, the contact 12 is a key part of the connector that permits high transmission capacity optical fibers to connect various components of the network.

Figure 2:
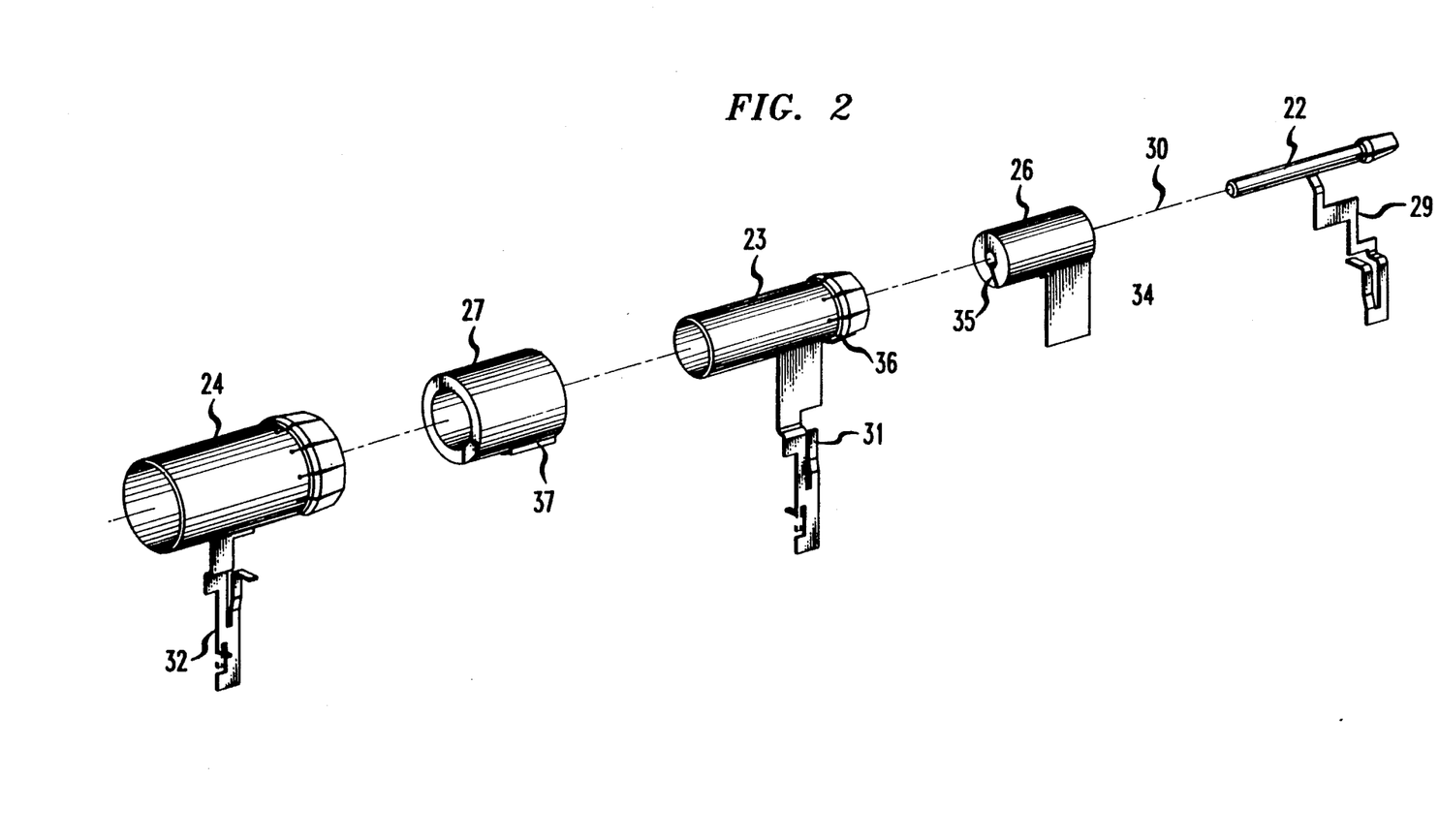
FIG. 2 is an exploded view of part of a connector in accordance with an illustrative embodiment of the invention.

Optical fiber cables typically have two electrical conductors along with the optical fiber and so, in a preferred embodiment of the invention, each connector comprises three coaxial conductive contacts as shown in FIG. 2. A signal contact 22 is surrounded by a power contact 23 which in turn is surrounded by a ground contact 24. Contacts 22 and 23 are electrically insulated by a hollow cylindrical insulator 26, while contacts 23 and 24 are insulated by a hollow cylindrical insulator 27. Signal contact 22 includes a transverse conductor 29 which extends transversely to central axis 30 and corresponds to the transverse conductor 21 of FIG. 1. Likewise, a transverse conductor 31 extends from contact 23 and a transverse conductor 32 extends from cylindrical contact 24. As will be appreciated later, the unique configurations of transverse conductors 29, 31 and 32 aid in the assembly of the connector and aid in making contact with an optoelectronic device of the connector.

Cylindrical insulator 26 includes a transverse insulator portion 34 for insulating transverse conductors 29 and 31 after assembly. Insulator 26 contains a transverse slot 35, contact 23 contains a transverse slot 36, insulator 27 contains a slot 37 and ground contact 24 contains a transverse opening not shown, all of which permit the transverse conductors 29 and 31 and the transverse insulator 34 to extend through them after assembly. The components are assembled by fitting insulator 26 over signal contact 22, power contact 23 over insulator 26, hollow insulator 27 over power contact 23 and ground contact 24 over insulator 27. Notice that these elements are held together by friction and that no particular tools are required for their assembly. Each of the contacts 22, 23 and 24 has a beveled plug end to the left and a beveled socket end defined by a circular array of cantilevered detent portions on the right end. Thus, after assembly, the three coaxial contacts 22, 23 and 24 have coaxial plug ends that are adapted to be plugged into the socket end of an identical adapter, and coaxial socket ends adapted to receive the plug end of another adapter.

Figure 3:
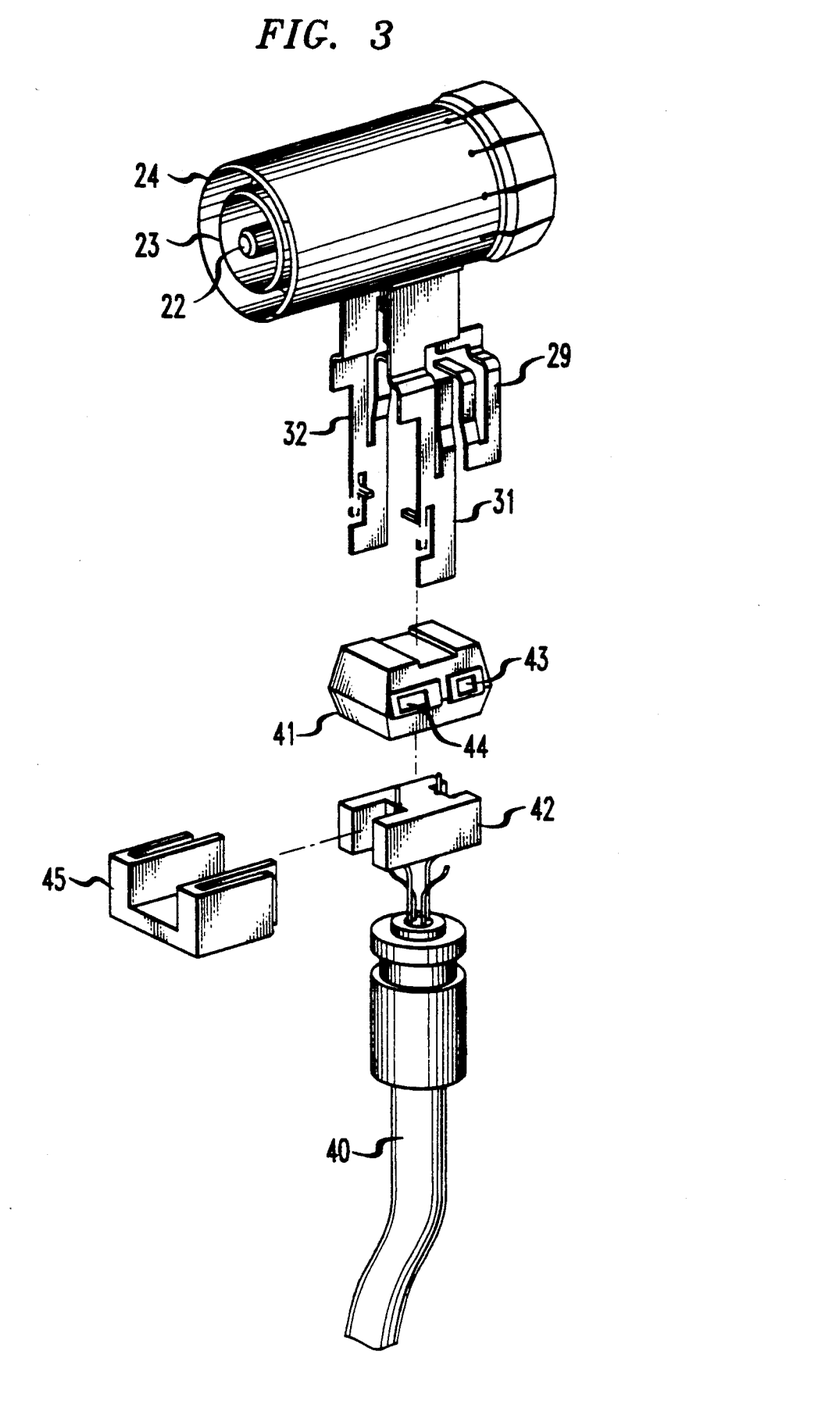
FIG. 3 is an exploded view showing the apparatus of FIG. 2 at a later stage of assembly.

The assembled coaxial contacts 22, 23 and 24 are shown in FIG. 3. The next step is to connect component conductors of an optical fiber cable 40 to an optoelectronic device 41 and to assemble the optoelectronic device in contact with transverse conductors 29, 31 and 32. The components of the cable 40 are directed to a crimp block 42 where they make contact with the underside of optoelectronic device 41. The optoelectronic device contains a signal contact 43 which is intended to contact signal conductor 29, a power contact 44 which is intended to contact transverse power conductor 31, and a ground contact on the side of the optoelectronic device not shown which is intended to make contact with ground conductor 32. A ferrite box 45 is designed to clamp transverse conductors 31 and 32 and crimp block 42 to give structural stability. During operation, the ferrite box 45 acts as a filter and suppresses the radiation of power from the power conductor.

Figure 4:
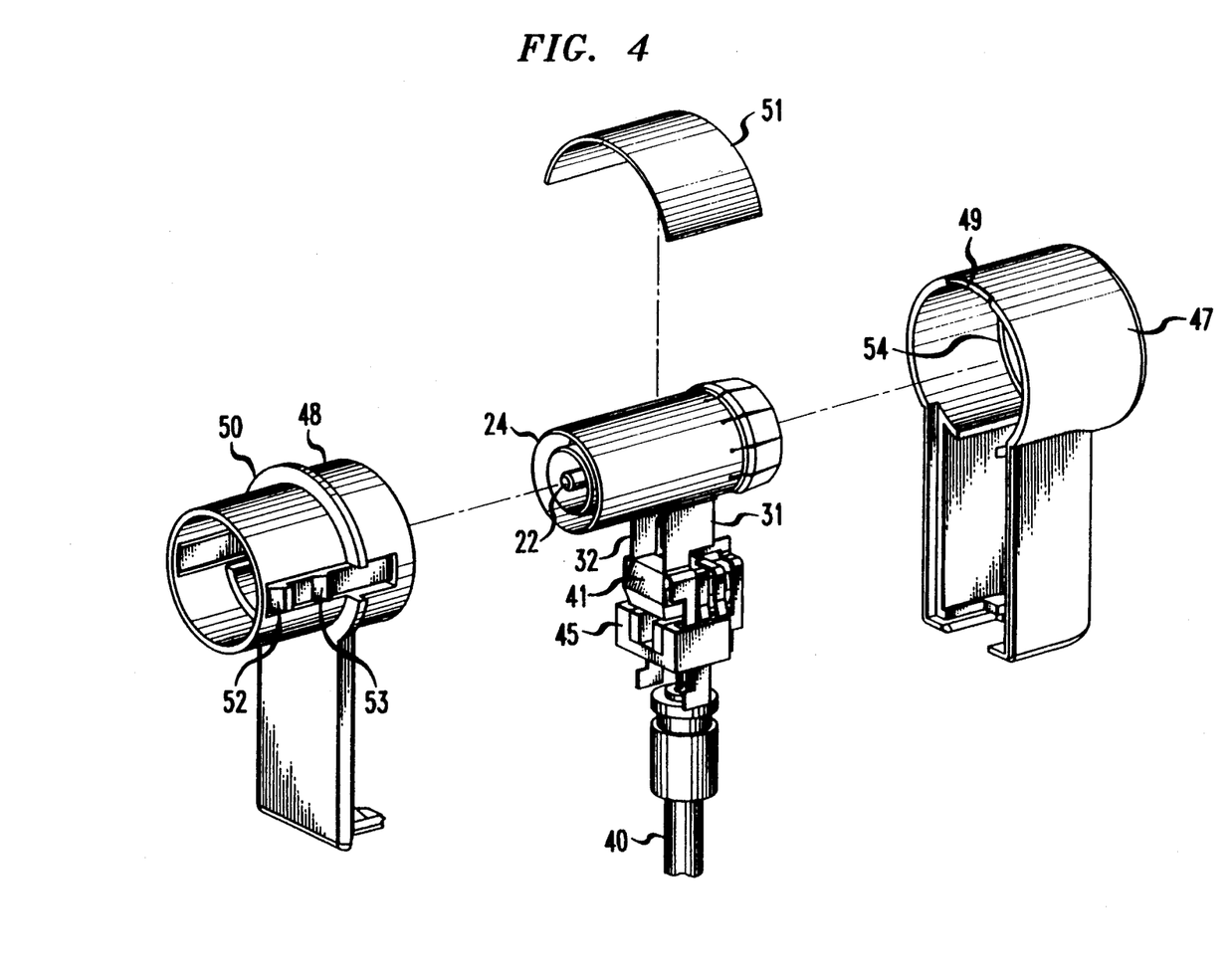
FIGS. 4 and 5 show the connector of FIG. 3 at later stages of assembly.

The design of the components of FIG. 3 allows them to be assembled and held together as shown in FIG. 4. The socket end of the contact is then encased by a socket housing 47, and the plug end is encased by a contact shroud 48. This shroud may be of insulative plastic, or, if it is desired to provide electromagnetic shielding for the contacts, it may be conductive metal or made of a conductive plastic. Insulation tape 51 may optionally be used to insulate ground contact 24 from socket housing 47 if it is desired that the socket housing be made of a conductor. Otherwise, the socket housing may be of plastic or other insulation material and the insulation tape eliminated. The socket housing preferably contains energy concentrators 49 which abut against a flange 50 of the contact shroud. As is known, energy concentrators may be used to permit ultrasonic bonding of two abutting elements.

The contact shroud also contains first and second latch members 52 and 53 which can be deflected inwardly. The socket housing 47 contains on an inner surface a circumferential detent 54 which is adapted to engage a latch 52. One can see that when the latch of one connector engages the circumferential detent 54 of another connector, the two connectors can be freely rotated, with respect to each other, but are axially locked together.

Figure 5:
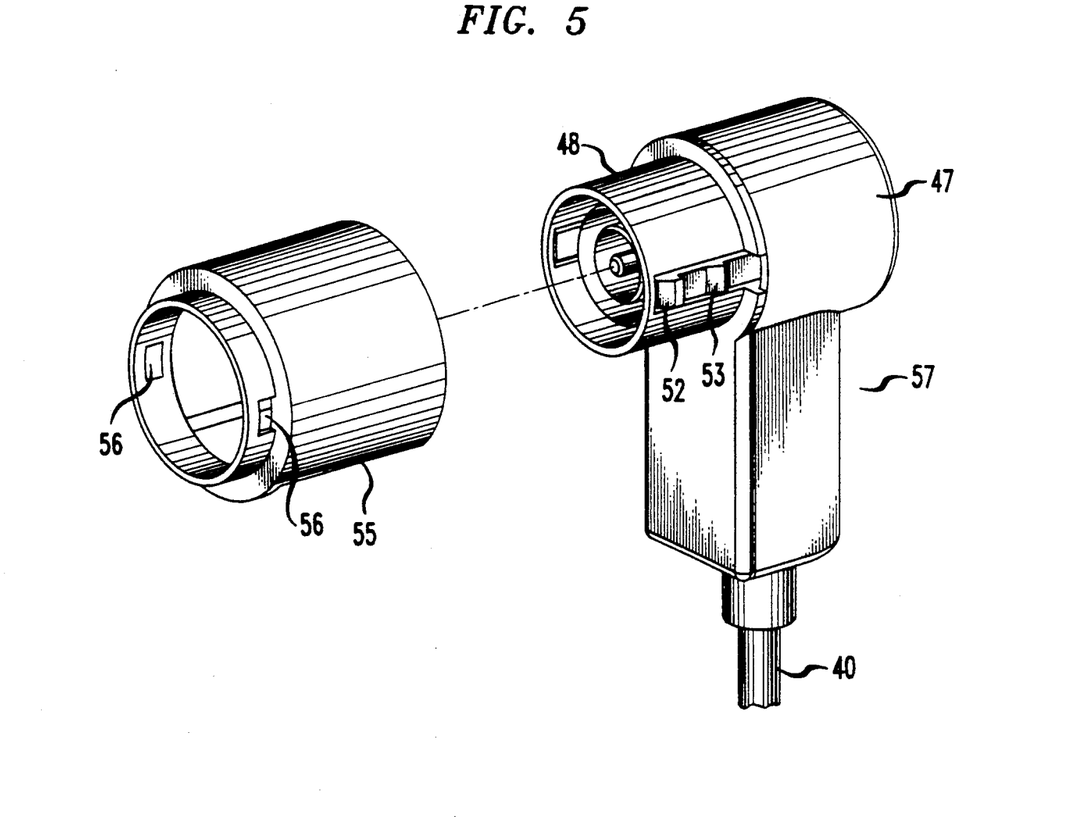
Figure 6:
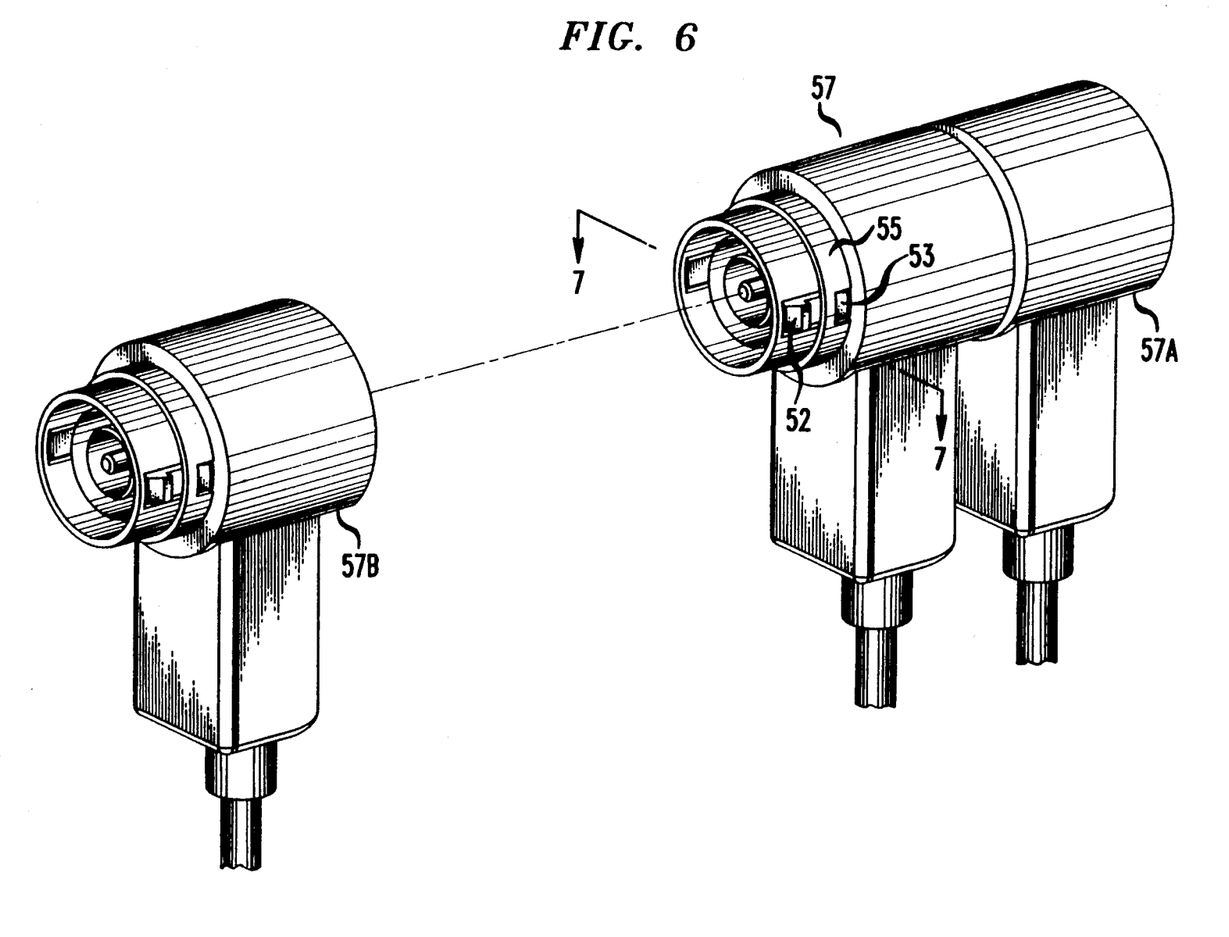
FIG. 6 is a perspective view of interconnected connectors of the type shown in FIG. 5.

Referring to FIG. 5, after socket housing 47 has been bonded to contact shroud 48, a sliding housing member 55 is assembled to surround the contact shroud 48 such that latch members 53 protrude through apertures 56. This completes the assembly of the connector 57, and thereafter the connector 57 is adapted to be connected to other connectors 57A and 57B as shown in FIG. 6. When the connectors are plugged together, the various contacts are held in frictional engagement and axial movement of the connectors is restrained by latch 52 which, as mentioned before, engages a circumferential detent of the mating socket housing. A disconnect is made by axially sliding the sliding housing 55 to depress latch 53. This likewise depresses latch 52 from the corresponding circumferential detent and allows a mating connector to be disengaged. Latches 52 and 53 are radially outwardly spring-biased to return to their normal positions after the force has been removed.

Figure 7:
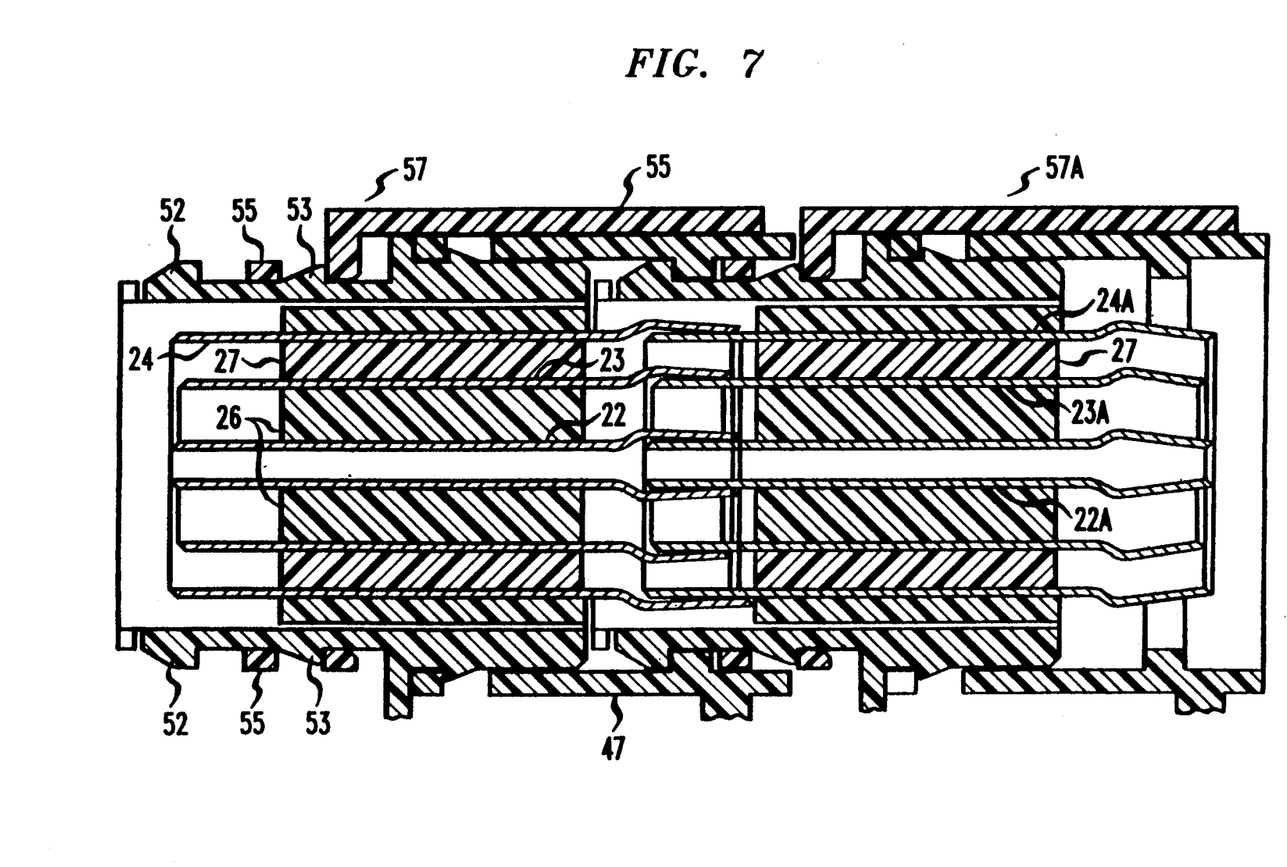
FIG. 7 is a view of lines 7—7 of FIG. 6.

FIG. 7 shows more clearly that sliding sleeve 55, when moved to the right, deflects latches 53 inwardly which in turn deflects latches 52 inwardly. FIG. 7 also clearly shows the engagement of the plug ends of contacts 24A, 23A and 22A of a connector 57A with the socket ends of contacts 24, 23 and 22 of the connector 57. One can see that the socket ends of contacts 22, 23 and 24 constitute a circular array of cantilevered detent portions, each of which is deflected away from the central axis when engaged with a plug end. For simplicity, the details of the optoelectronic device and the transverse conductors are not shown in FIG. 7.

From the foregoing, one can appreciate that optical fiber cable connectors have been described which are freely rotatable with respect to each other, which thereby permits different optical fiber cables to extend in arbitrary radial directions with respect to a common central axis. The connectors require a minimum of operator skill for assembly. The only permanent bonding required is the ultrasonic bond of the socket housing 47 to the contact shroud 48. During use, the connectors are easy to connect and disconnect. Numerous computers, for example, can be interconnected with optical fiber cable and large quantities of information can therefore be transmitted between and among the computers by the optical fiber. The connectors require conversion to electrical energy, but the electrical energy is transmitted only a short distance between interconnected optoelectronic devices which minimizes the electrical loss of the connectors. It would of course be much more difficult to provide interconnection capability using optical fiber taps in which there is no conversion to electrical energy. Since optical fiber taps inherently involve signal loss, the loss of our connectors is not considered to be a comparative disadvantage.

A socket connector has also been designed for use with devices to which it is desired to connect single connector 57. This design is of course compatible with the design of the connector 57 and, for brevity, has not been described. Its use, however, is considered to be consistent with the principles of the invention. Various other embodiments and modifications may be made by those skilled in the art without departing from the spirit and scope of the invention.

We claim:

1. Apparatus for interconnecting a plurality of optical fibers comprising:
   means comprising an optoelectronic device connected to an end of each optical fiber for converting optical signals to electrical signals and for converting electrical signals to optical signals;
   a plurality of connectors, each associated with one of said optical fibers, each connector comprising said optoelectronic device and first and second coaxial cylindrical contacts each having a cylindrical plug end and a cylindrical socket end located on a common axis and a transverse conductor extending transversely to said axis and connected to the optoelectronic device of such connector;
   the plug ends of each first and second contact of each connector being adapted to fit snugly within the socket ends of other first and second contacts of another connector, whereby all of said first and second contacts may be arranged along said common axis;
   each of said first and second contacts being free to rotate with respect to first and second contacts connected thereto, whereby the various optical fibers may extend in different radial directions from said axis.

2. The apparatus of claim 1 wherein:
   each plug end defines at least a portion of a conductive annulus;
   each socket end defines at least a portion of a conductive annular detent;
   each conductive annulus of a plug end is adapted to fit snugly within a conductive annular detent of a socket end and to be rotatable therein through three hundred sixty degrees;
   and each conductive annulus makes continuous conductive contact with a conductive annular detent within which it is contained regardless of the angle of rotation thereof.

3. The apparatus of claim 2 wherein:
   each conductive annular detent is defined by a circular array of cantilevered detent portions, each adapted to be deflected away from said axis to receive a plug end;
   and each plug end defines a continuous conductive annulus.

4. The apparatus of claim 3 wherein:
   each connector further comprises a first hollow cylindrical insulator snugly surrounding the first contact;
   each second contact snugly surrounds a first hollow cylindrical insulator.

5. The apparatus of claim 4 wherein:
   each connector further comprises a second hollow cylindrical insulator snugly surrounding the second contact thereof;
   and a third contact comprising a cylindrical plug end and a cylindrical socket end snugly surrounds each second hollow cylindrical insulator.

6. The apparatus of claim 5 wherein:
   each third contact has a transverse conductor extending transversely to said axis and connected to one of said optoelectronic devices;
   each first and second hollow cylindrical insulator has therein an opening to permit a transverse conductor to extend therethrough.

7. The apparatus of claim 6 wherein:
   the plug end of each third contact is adapted to fit snugly within the socket end of another third contact, whereby all of the third contacts may be connected and arranged along said axis;
   and each of said plug ends is free to rotate with respect to a socket end within which it fits.

8. The apparatus of claim 7 wherein:
   the first, second and third contacts of each connector are each essentially a hollow conductive cylinder having a plug end beveled in one direction and a socket end beveled in a direction adapted to mate with a beveled plug end of a corresponding plug end.

9. The apparatus of claim 8 wherein:
   each socket end of each second and third contact is defined by a circular array of cantilevered detent portions, each adapted to be deflected away from said axis to receive a corresponding plug end;
   and each plug end of the second and third contacts defines a continuous conductive annulus.

10. The apparatus of claim 7 wherein:
    the optoelectronic device of each connector has a first electrical terminal associated with an optical signal transmitted by the optical fiber, a second electrical terminal connected to a first electrical line associated with the optical fiber, and a third electrical terminal associated with the second electrical line associated with said optical fiber;
    and each transverse conductor is connected to a separate one of said terminals of said optoelectronic device.

11. The apparatus of claim 7 wherein:
    the first electrical line constitutes a power line;
    the second electrical line constitutes a ground line;
    the first contact is connected to the first terminal;
    the second contact is connected to the second terminal;
    and the third contact is connected to the third terminal.

12. The apparatus of claim 6 wherein:
    an insulative socket housing member surrounds the socket end of each third contact;
    a shroud member surrounds the plug end of each third contact;
    each shroud member includes a radially-biased first latch member;
    and each socket member has a circumferential detent on an inner surface thereof for engaging a latch member of an adjacent connector, whereby contiguous connectors can be latched together in axial succession.

13. The apparatus of claim 12 wherein:
the shroud member is made of conductive material for giving electromagnetic shield of the contacts.

14. The apparatus of claim 13 wherein:
each shroud member includes a radially-biased second latch member connected to the first latch member of such shroud member and axially arranged to be closer to the socket end of the connector of which it is a part than is the first latch member;

a hollow cylindrical sliding housing member surrounds the shroud member and includes an aperture through which the second latch member is adapted to protrude;

and said sliding housing member is adapted to be moved axially to depress the second latch member, thereby to disengage the first latch member from a corresponding circumferential detent of a socket housing of an adjacent connector.

15. A connector comprising:
a plurality of hollow cylindrical coaxial conductive contacts, each of different diameter and each having a plug end and a socket end;

all of the contacts being of substantially the same axial length, being substantially coextensive, and surrounding a common axis;

an outer surface of each plug end being adapted to frictionally engage an inner surface of a socket end of a hollow cylindrical contact of another connector, and an inner surface of each socket end being adapted to frictionally engage an outer surface of a plug end of a hollow cylindrical contact of another connector;

a hollow cylindrical insulator separating successive coextensive coaxial contacts;

a housing surrounding an outermost one of said contacts, said housing having a first deflectable latch member at one end thereof and an inner circumferential detent on another end thereof, the first latch member being adapted to engage a circumferential detent of another connector, and said inner circumferential detent of the housing being adapted to engage a latch member of yet another connector;

a transverse conductor extending transversely with respect to said common axis from each of said coaxial contacts, said transverse conductors being adapted to be connected to another element;

means comprising said plug ends, said socket ends, said latch and said circumferential detent for allowing said connector to be axially connected to other connectors at opposite axial ends thereof, and to be rotatable through substantially three hundred sixty degrees with respect to such connectors to which it is connected.

16. The connector of claim 15 wherein:
said insulative housing member has a second deflectable latch member connected to the first latch member and being closer than the first latch member to the socket end of the connector;

the first and second latch members being radially spring-biased outwardly from said common axis;

a hollow cylindrical sliding member surrounding part of the housing member and including an aperture through which the second latch member is adapted to protrude;

said sliding member being adapted to be moved axially to depress the second latch member, thereby to disengage the first latch member from a corresponding circumferential detent of an axially adjacent connector.

17. The connector of claim 16 wherein:
said adapter comprises three coaxial contacts, and an inner and a middle contact being separated by a first hollow cylindrical insulator, and the middle and an outer contact being separated by a second hollow cylindrical insulator;

and openings in said first and second hollow cylindrical insulators and said middle and outer contacts permit all of said transverse conductors to extend transversely with respect to the common axis.

18. The connector of claim 17 wherein:
a transverse insulator extends from the first hollow cylindrical insulator transverse to said common axis;

and means comprising the transverse insulator for electrically insulating the transverse conductors.

19. The connector of claim 18 wherein:
each of said transverse conductors is connected to a common optoelectronic device, and the optoelectronic device is adapted to be connected to an optical fiber cable.

* * * * *